United States Patent
Agarwal et al.

(10) Patent No.: US 12,407,285 B2
(45) Date of Patent: Sep. 2, 2025

(54) MOTOR CONTROL

(71) Applicant: Infineon Technologies Austria AG, Villach (AT)

(72) Inventors: Nitin Agarwal, Torrance, CA (US); Tao Zhao, Mission Viejo, CA (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 154 days.

(21) Appl. No.: 18/375,022

(22) Filed: Sep. 29, 2023

(65) Prior Publication Data

US 2025/0112575 A1  Apr. 3, 2025

(51) Int. Cl.
*H02P 21/18* (2016.01)
*H02P 27/08* (2006.01)

(52) U.S. Cl.
CPC ............ *H02P 21/18* (2016.02); *H02P 27/08* (2013.01)

(58) Field of Classification Search
CPC ...... H02P 1/18; H02P 1/24; H02P 1/46; H02P 6/00; H02P 6/007; H02P 6/08; H02P 6/12; H02P 6/16; H02P 6/17; H02P 6/14; H02P 6/15; H02P 27/08; H02P 27/06; H02P 25/026; H02P 21/18; H02P 2207/05; H02P 6/06; H02P 27/00; H02P 8/18; G05B 2219/37314; G05B 2219/37094; G05B 2219/34052; G05B 11/28; G05B 19/231; G05B 2219/42237; G05B 19/232; G05B 19/19; H03K 5/1252; B62D 5/046
See application file for complete search history.

(56) References Cited

U.S. PATENT DOCUMENTS

2014/0035496 A1* 2/2014 Mizuo .................. H02P 8/18
318/400.17

* cited by examiner

*Primary Examiner* — Antony M Paul
(74) *Attorney, Agent, or Firm* — Cooper Legal Group LLC (57) ABSTRACT

According to some embodiments, a motor controller for controlling a motor includes a position interface configured to receive a motor position signal indicative of a position of the motor, and a pulse width modulation (PWM) unit configured to generate a PWM signal for driving the motor. An angle and speed unit is configured to determine a speed and a position of the motor based on transitions in the motor position signal, wherein transition intervals are defined between the transitions, determine a PWM count of cycles in the PWM signal during a first transition interval of the transition intervals, and update the position of the motor during a second transition interval of the transition intervals based on the PWM count to generate an updated position. A controller is configured to send a control signal for controlling the motor to the PWM unit based on the speed and the updated position.

20 Claims, 8 Drawing Sheets

MOTOR CONTROL

TECHNICAL FIELD

The present disclosure relates generally to motor control.

BACKGROUND

Permanent Magnet Synchronous Motors (PMSMs) are employed in consumer and industrial motor applications due to their higher reliability and smaller size compared to other types of motors. To achieve high efficiency and low vibration and acoustic noise, Field-Oriented Control (FOC) techniques are often used in consumer and industrial PMSM control for cordless power tools, automated guided robots, cordless gardening tools, eBikes, drones, robotics, fans, pumps, compressors, geared motors, and the like.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method for controlling a motor comprises generating a pulse width modulation (PWM) signal for driving the motor, determining a position of the motor based on transitions in a motor position signal, wherein transition intervals are defined between the transitions, determining a PWM count of cycles in the PWM signal during a first transition interval of the transition intervals, updating the position of the motor during a second transition interval of the transition intervals based on the PWM count to generate an updated position, and controlling the motor based on the updated position.

According to some embodiments, a system for controlling a motor comprises means for generating a pulse width modulation (PWM) signal for driving the motor, means for determining a position of the motor based on transitions in a motor position signal, wherein transition intervals are defined between the transitions, means for determining a PWM count of cycles in the PWM signal during a first transition interval of the transition intervals, means for updating the position of the motor during a second transition interval of the transition intervals based on the PWM count to generate an updated position, and means for controlling the motor based on the updated position.

According to some embodiments, a motor controller for controlling a motor comprises a position interface configured to receive a motor position signal indicative of a position of the motor, a pulse width modulation (PWM) unit configured to generate a PWM signal for driving the motor, an angle and speed unit configured to determine a speed and a position of the motor based on transitions in the motor position signal, wherein transition intervals are defined between the transitions, determine a PWM count of cycles in the PWM signal during a first transition interval of the transition intervals, and update the position of the motor during a second transition interval of the transition intervals based on the PWM count to generate an updated position, and a controller configured to send a control signal for controlling the motor to the PWM unit based on the speed and the updated position.

According to some embodiments, a system comprises a motor, an angle sensor interfacing with the motor to generate pulses indicative of a position of the motor, a motor controller comprising a position interface configured to receive the pulses, a pulse width modulation (PWM) unit configured to generate a PWM signal for driving the motor, an angle and speed unit configured to determine a speed and a position of the motor based on transitions in the pulses, wherein transition intervals are defined between the transitions, determine a PWM count of cycles in the PWM signal during a first transition interval of the transition intervals, and update the position of the motor during a second transition interval of the transition intervals based on the PWM count to generate an updated position, and a controller configured to send a control signal for controlling the motor to the PWM unit based on the speed and the updated position.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

Field-Oriented Control (FOC) is a method of variable speed control for three-phase alternating current (AC) electric motors to improve power efficiency with fast control response over a full range of motor speeds. Various implementations of structures, components, and techniques for providing control of three-phase AC motors are discussed herein. Structures, components, and techniques are discussed with reference to example three-phase Permanent Magnet Synchronous Motor (PMSM) devices and control systems. However, this application is not intended to be limiting, and is for ease of discussion and illustrative convenience. The techniques and devices discussed may be applied to other motor designs, control structures, and the like (e.g., single-phase and three-phase variable frequency drives, digital phase converters, three-phase and single-phase motors, direct torque control drives, induction motors, regenerative drives, brushless DC motors, etc.), and remain within the scope of the disclosure.

Figure 1A:
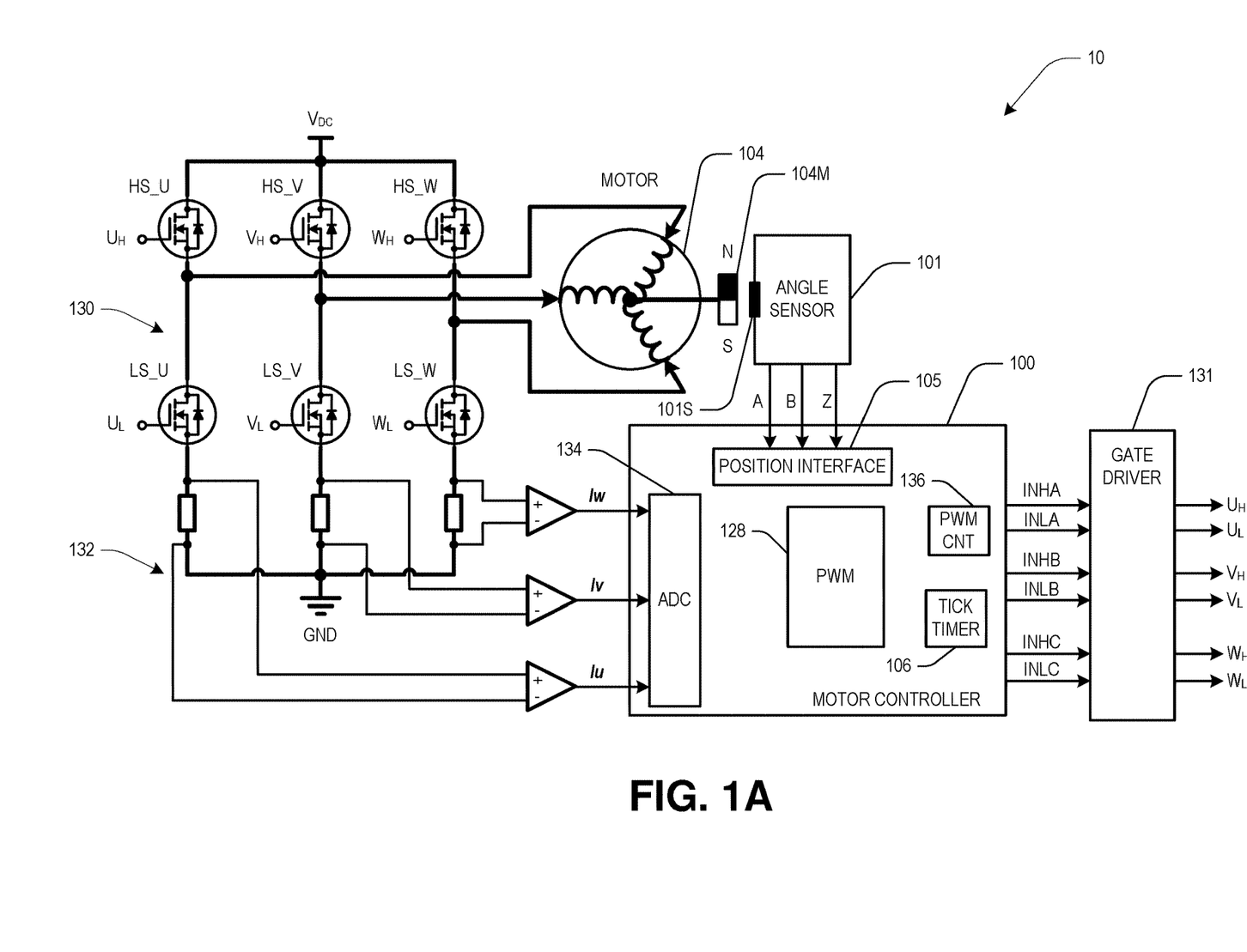
FIGS. 1A, 1B, 1C, and 1D are schematic diagrams of a motor system, according to some embodiments.

FIGS. 1A, 1B, 1C, and 1D are schematic diagrams of a motor system 10, according to some embodiments. In some embodiments, the motor system 10 includes a motor controller 100 that uses an angle sensor 101 and an angle and speed unit 102 to estimate a rotor position, $\hat{\varphi}$, and a rotor speed, $\hat{\omega}$, to support FOC techniques for controlling a motor 104. The motor controller 100 may be implemented by a microcontroller unit. Rotor speed is indicative of motor speed. In some embodiments, the angle sensor 101 comprises a magnetic sensor 101S that detects a Z pulse from a magnet 104M mounted to a shaft of the motor 104 that signals a mechanical revolution of the shaft and also detects A and B pulses from the magnets of the rotor. The rotor magnets are arranged in pole pairs, and the number of pulses per revolution depends on the number of pole pairs. For example, the motor 104 may comprises 15 pole pairs and the angle sensor 101 provides 4096 encoder pulses per revolution. The mechanical Z pulse and the electrical A and B pulses are received at a position interface 105. Each falling or rising edge of the A and B signals is referred to as a tick (e.g., a transition), resulting in a tick count of 16,384 ticks per revolution. Hence, each tick represents a fixed angular position change, $\Delta P_T$, in rotor position equal to the tick count divided by 360° or $2\pi$ radians. A tick timer 106 determines a time interval, $T_{TICK}$, between ticks, which is indicative of rotor speed based on the equation:

$$\hat{\omega} = \Delta P / T_{TICK}.$$

According to some embodiments, the motor controller 100 estimates changes in rotor position during the tick interval to increase the resolution of the estimated rotor position, $\hat{\varphi}$, signal. The actual rotor position is updated at every tick.

The goal of the motor controller 100 is to achieve smooth operation from zero speed to maximum speed of the motor 104 even at different and unknown time-varying disturbances. Using a PMSM motor as an example, the continuous-time voltage equations of the PMSM in the d-q coordinate system (where the d-axis is aligned with the magnetic axis of the motor permanent magnets, and the q-axis is perpendicular to the d-axis) are:

$$V_d = RI_d + L_d \frac{dI_d}{dt} - \omega L_q I_q \text{ and} \quad (1)$$

$$V_q = RI_q + L_q \frac{dI_q}{dt} + \omega L_d I_d + \omega \Psi, \quad (2)$$

where:
$V_d$ and $V_q$ are the d-axis and q-axis voltages (unit Volts),
$I_d$ and $I_q$ are the d-axis and q-axis currents (Amperes),
R is the stator winding resistance (Ohm),
$L_d$ and $L_q$ are the d-axis and q-axis stator winding inductances (Henry),
$\omega$ is the electrical speed corresponding to frequency of stator current, and rotor speed (rad/s), and
$\Psi$ is the permanent magnet flux linkage (Weber).

To implement FOC control, the motor controller 100 uses a Park transform to convert between a D-Q rotor fixed reference frame defined by a torque generating component, Q, and a flux generating component, D, and an $\alpha$-$\beta$ stationary reference frame and a Clarke transform to convert between a three-phase reference frame defined by V, U, and W components to the $\alpha$-$\beta$ stationary reference frame. The $\alpha$-$\beta$ stationary reference frame signals are sinusoidal signals at steady state, and the D-Q rotor fixed reference frame signals are nearly constant at steady state. Park transforms, inverse Park transforms, Cartesian to polar transforms, and Clarke transforms are known in the motor control art and are not described in greater detail herein.

In the three-phase reference frame, the U, V, and W components are separated by 120° and are stationary. In the $\alpha$-$\beta$ stationary reference frame, the components are electrically orthogonal and stationary. In the D-Q rotor fixed reference frame, the components are electrically orthogonal and rotating. For purposes of this description it is assumed that the motor 104 rotates in a positive direction, i.e., the counterclockwise direction, so the angles and angular speeds are positive numbers. The signs of the angles and angular speeds may be changed for a motor 104 that rotates in the negative direction, i.e., the clockwise direction. Coordinate systems may be referenced to the stator and/or the rotor of the motor 104. For example, the D-Q rotor fixed reference frame is fixed to the rotor and the components of the D-Q coordinate system rotate together. The direct axis of the D-Q rotor fixed reference frame is oriented in the direction from the rotor permanent magnet south pole (S) to north pole (N). The quadrature axis of the D-Q rotor fixed reference frame is perpendicular to the rotor flux (e.g., to the rotor).

The three-phase sinusoidal currents $I_U$, $I_V$, and $I_W$ of the motor stator windings are separated by 120° and generate three non-rotating, pulsating magnetic fields in the U, V, and W directions, respectively, resulting in a rotating magnetic field (stator flux space vector). Vector addition of $I_U$, $I_V$, and $I_W$ gives a current space vector. The magnitude of the current space vector may be scaled up or down with no change of direction for a motor rotating at speed, $\omega$.

In the stationary $\alpha$-$\beta$ reference frame, the rotating stator flux space vector represents the rotating stator magnetic flux. Vector addition of the three-phase 120° separated stator phase voltages $V_U$, $V_V$, and $V_W$ defines a rotating voltage space vector. A rotating rotor permanent magnet generates a rotating rotor magnetic flux space vector. The magnitudes and directions of the above-mentioned rotating space vectors can be represented by radial coordinates and polar angles in polar coordinate systems. Techniques for transforming between the reference frames are known in the art.

Figure 1B:
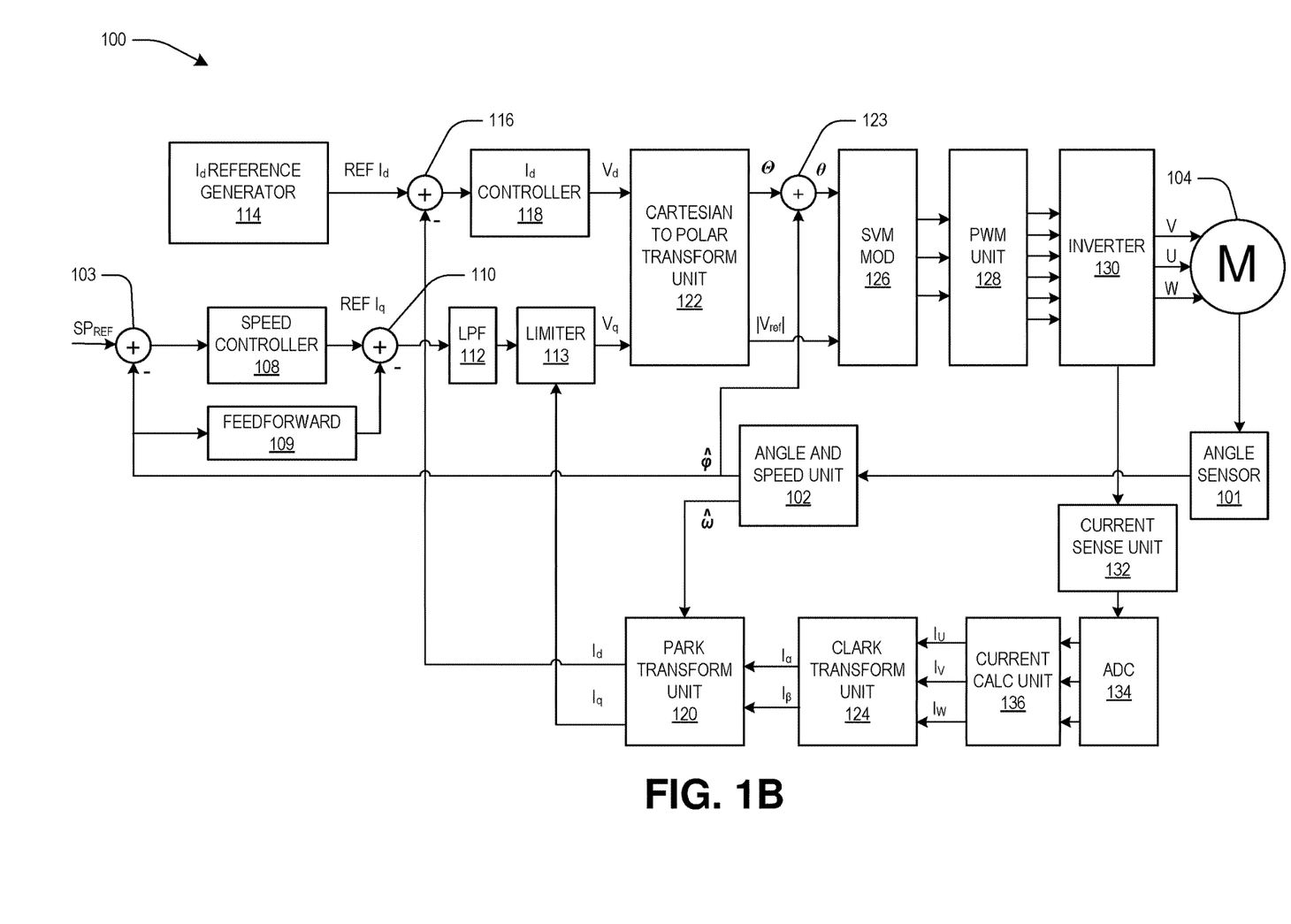

Referring to FIG. 1B, an embodiment of the motor controller 100 is provided, according to some embodiments. A reference speed, $SP_{REF}$, representing a desired rotational speed for the motor 104, is received as an input and is provided to an adder 103 which also receives rotor speed, $\hat{\omega}$, feedback from the angle and speed unit 102 to generate an error signal for input to a speed controller 108. The rotor speed, $\hat{\omega}$, is also provided to an optional feedforward unit 109. In some embodiments, the speed controller 108 is a proportional-integral (PI) controller that operates to drive its input error signal to zero. Outputs of the speed controller 108 and the feedforward unit 109 are provided to an adder 110. The adder 110 provides an input signal to a low pass filer (LPF) 112. The output of the LPF 112 is provided to an optional limiter 113. The limiter 113 generates a demand torque generating voltage parameter, $V_q$. The LPF 112 provides filtering for low speed operation. In some embodiments, the limiter 113 limits the $V_q$ value based on $I_q$ current or motor phase current information.

A reference generator 114 provides a reference flux generating current parameter ($I_d$) as an input to an adder 116. The adder 116 also receives a feedback flux generating current parameter ($I_d$) and provides an error signal input to an $I_d$ controller 118. In some embodiments, the $I_d$ controller 118 is a proportional-integral (PI) controller that operates to drive its error input signal to zero. The limiter 113 outputs a demand torque generating voltage parameter, $V_q$, and the $I_d$ controller 118 outputs a demand flux generating voltage parameter, $V_d$. In some embodiments, the flux generating component $I_d$ is controlled to zero. In some embodiments, the flux generating component $I_d$ is controlled using a negative reference value to implement flux-weakening control to extend the operating speed range of the motor 104. In some embodiments, the flux generating component $I_d$ is controlled using a positive reference value to implement flux-boosting control.

The motor controller 100 comprises a Park transform unit 120, a Cartesian to polar transform unit 122, and a Clarke transform unit 124 to convert between reference frames. The Park transform unit 120 transforms the α-β stationary reference frame to the D-Q rotor fixed frame using a rotor speed, $\hat{\omega}$, from the angle and speed unit 102. The Cartesian to polar transform unit 122 transforms the D-Q rotor fixed frame to a polar reference frame designated by Θ and $|V_{ref}|$. The output, Θ, of the Cartesian to polar transform unit 122 is combined in an adder 123 with the rotor position, $\hat{\varphi}$, from the from the angle and speed unit 102. The Clarke transform unit 124 transforms the three-phase reference frame to the α-β stationary reference frame.

The Cartesian to polar transform unit 122 provides the polar reference signals to a space vector modulator 126. The space vector modulator 126 controls a pulse width modulation (PWM) unit 128 to generate PWM outputs signals, e.g.: INHA, INLA, INHB, INLB, INHC, and INLC, in FIG. 1A to drive an inverter 130 through a gate driver 131. The output signals of the inverter 130 drive the phases of the motor 104. In some embodiments, the inverter 130 comprises a three-phase two-level voltage inverter including high side switches HS_U, HS_V, HS_W and low side switches LS_U, LS_V, LS_W (see FIG. 1A).

A current sense unit 132 senses phase currents of the motor 104. In some embodiments, as illustrated in FIG. 1A, the current sense unit 132 comprises three shunt resistors associated with the three legs of the inverter 130 to sense the current of each phase of the motor 104, as illustrated in FIG. 1A. In some embodiments, two shunt resistors are used to sense the current of two phases of the motor 104. The current from the third phase of the motor 104 may be calculated based on the relationship $I_U+I_V+I_W=0$. In some embodiments, a single shunt resistor is inserted into to a DC link of the inverter 130 to sense a DC link current, and a three-phase current reconstruction is used to obtain the current information for each phase of the motor 104. In some embodiments, sensors such as motor phase in-line shunt resistors, Hall sensors, current transducers (e.g. LEM current sensors), or other motor phase current sensors may be used to obtain the current information for each phase of the motor 104.

An analog-to-digital converter (ADC) 134 receives the sensed voltages from the current sense unit 132 to generate digital inputs for a current calculation unit 136. The current calculation unit 136 generates phase current measurement parameters, $I_U$, $I_V$, and $I_W$. The phase current measurement parameters are provided to the Clarke transform unit 124 to generate α-β stationary reference frame feedback current parameters, $I_\alpha$, $I_\beta$. The stationary reference frame feedback current parameters are provided to the Park transform unit 120 to generate a feedback torque generating current parameter, $I_q$, and a feedback flux generating current parameter, $I_d$.

The angle and speed unit 102 estimates the rotor position, $\hat{\varphi}$, and the rotor speed, $\hat{\omega}$, using data from the angle sensor 101. One Z encoder pulse is received every one mechanical revolution. The mechanical angle increments at every tick generated from the A and B pulses. Electrical angle can be calculated based on the number of A and B pulses every revolution and the number of motor pole pairs. In some embodiments, the motor controller 100 comprise a PWM counter 138 that counts the number of PWM pulses between ticks (e.g., transitions), where the PWM count is inversely related to rotor speed.

Some of the disclosed techniques may be readily implemented in software using object or object-oriented software development environments that provide portable source code that can be used on a variety of computer or workstation platforms. Alternatively, the disclosed techniques and/or arrangements may be implemented partially or fully in using standard logic circuits or VLSI design. In some embodiments, the motor 104, the inverter 130, the current sense unit 132, and the ADC 134 are hardware-implemented and the remaining units in FIG. 1B are software implemented. However, other combinations of hardware, firmware, or software are contemplated.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Figure 2:
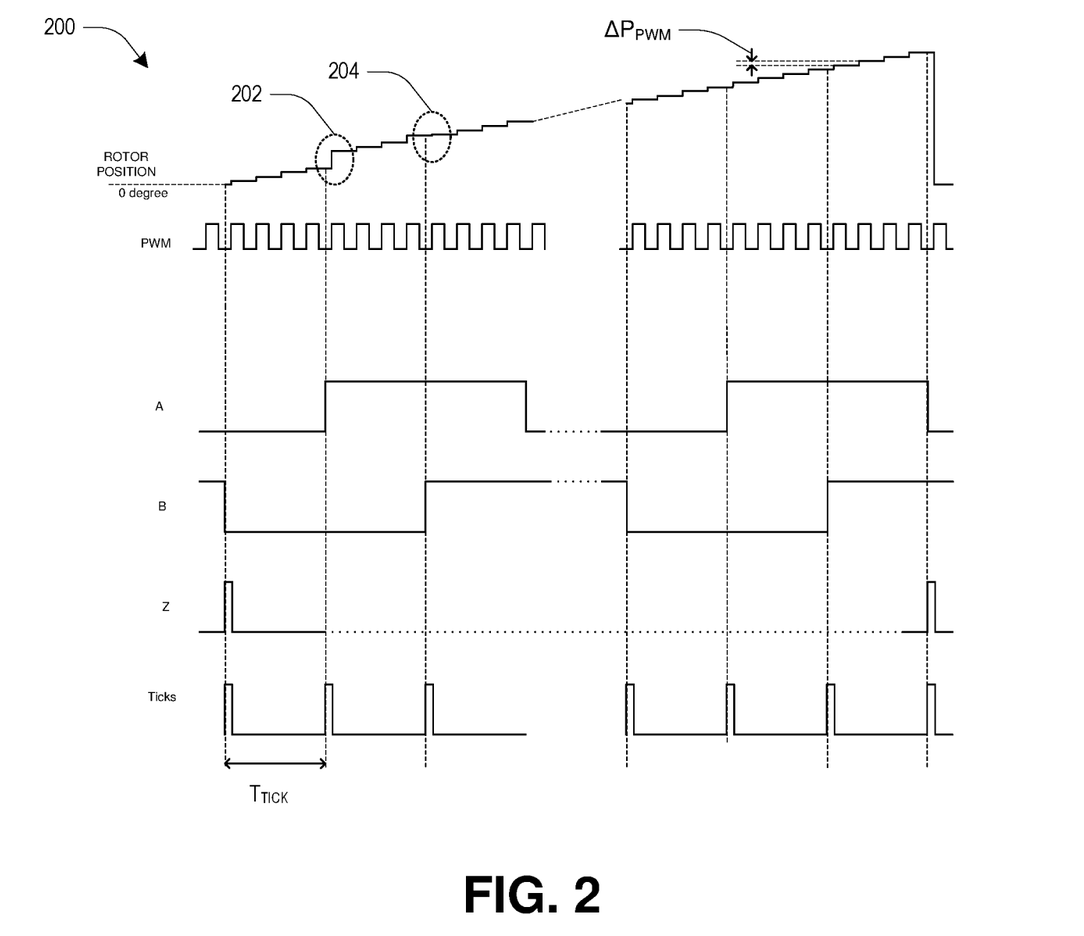
FIG. 2 illustrates signals used for estimating position of a motor, according to some embodiments.

FIG. 2 illustrates signals used for estimating position of a motor 104, according to some embodiments. Output signals, A, B, and Z, from the angle sensor 101 are illustrated. The tick waveform is generated from the A and B pulses, where a tick pulse is generated for each falling or rising edge of the A or B pulses. In some embodiments, the PWM signal has a fixed frequency, such as 20 kHz (period=50 microseconds). In some embodiments, the motor controller 100 implements a PWM interrupt every PWM cycle, a tick interrupt every tick, a speed interrupt at a fixed interval, such as every 1 millisecond, and a control loop for the $I_d$ controller 118 after a predetermined number of PWM cycles.

The angle and speed unit 102 uses information from the angle sensor 101, the PWM counter 138, and the tick timer 106 to estimates the rotor position, $\hat{\varphi}$, and the rotor speed, $\hat{\omega}$.

The tick timer 106 determines a tick interval between ticks, and the PWM counter 138 counts the number of PWM cycles between ticks. Referring to FIG. 2, the angle and speed unit 102 determines an angular position change per PWM cycle metric, $\Delta P_{PWM}$, by dividing the angular position change per tick, $\Delta P_T$, by the PWM count. In some embodiments, the angle and speed unit 102 may use a filtering technique, such as a simple average (e.g., PWM count over two ticks), an exponentially weighted moving average (EWMA), or some other filtering technique to generate the $\Delta P_{PWM}$ metric based on the PWM count.

In some embodiments, the motor controller 100 implements a PWM interrupt every PWM cycle and a tick interrupt every tick. When a tick interrupt occurs, the motor controller 100 sets a tick flag indicating that new position information is available. During the processing of the PWM interrupt, the actual rotor angle is only updated if the tick flag is set. Otherwise the rotor angle is estimated using the $\Delta P_{PWM}$ metric. For example at 202, the tick interrupt is triggered and the tick flag is set. At the following PWM interrupt, the angular position is updated responsive to the tick flag being set. Note the step change at 202, indicating that the estimated angular position was noticeably less than the actual angular position. This scenario suggests that the motor 104 was accelerating between ticks. At 204, following the next tick interrupt, the PWM interrupt resulted in a less significant adjustment to the angular position suggesting that the rotor speed was relatively constant.

Figure 3A:
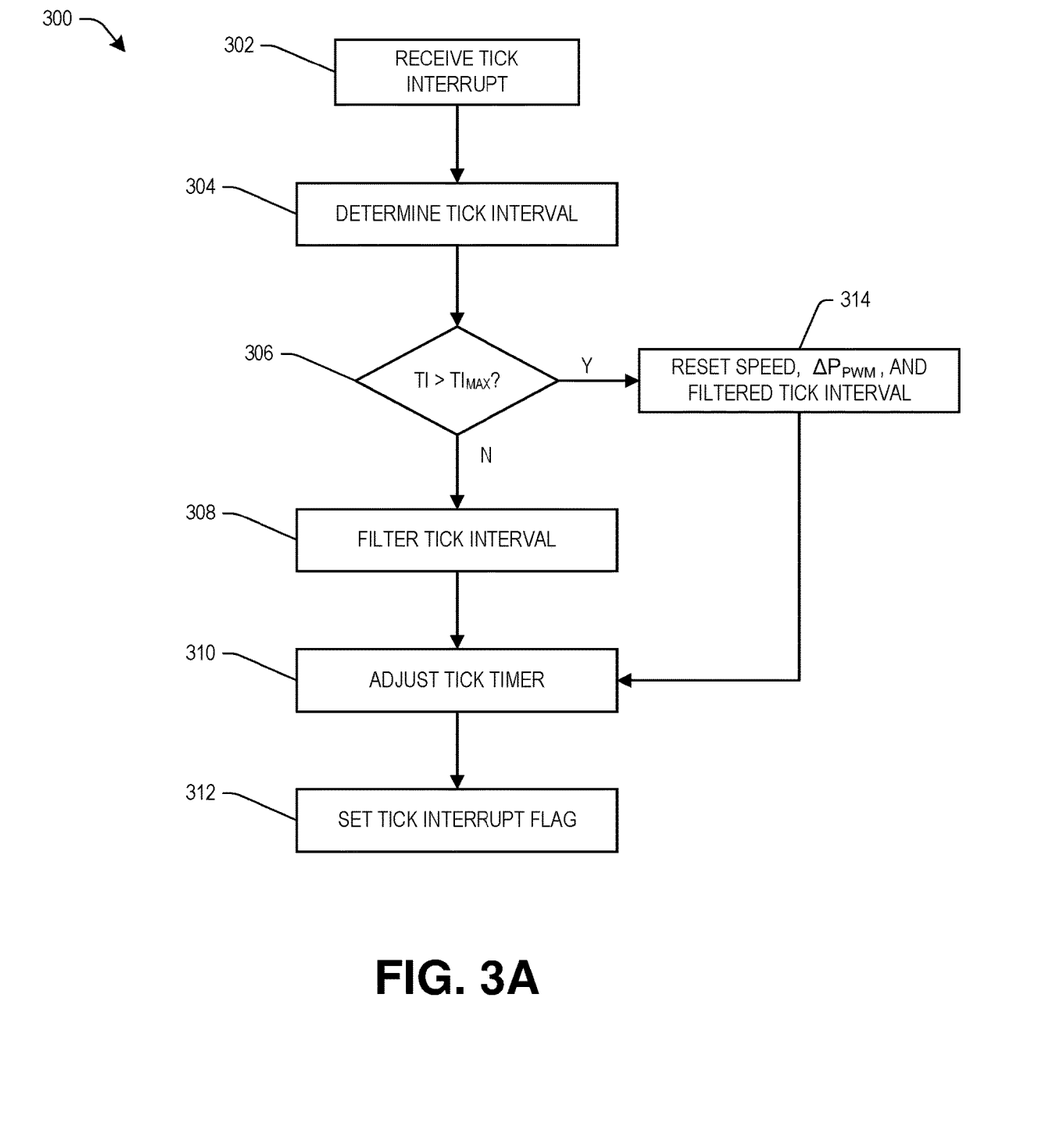
FIGS. 3A and 3B illustrate methods implemented in interrupt routines for estimating position of a motor, according to some embodiments.
Figure 3B:
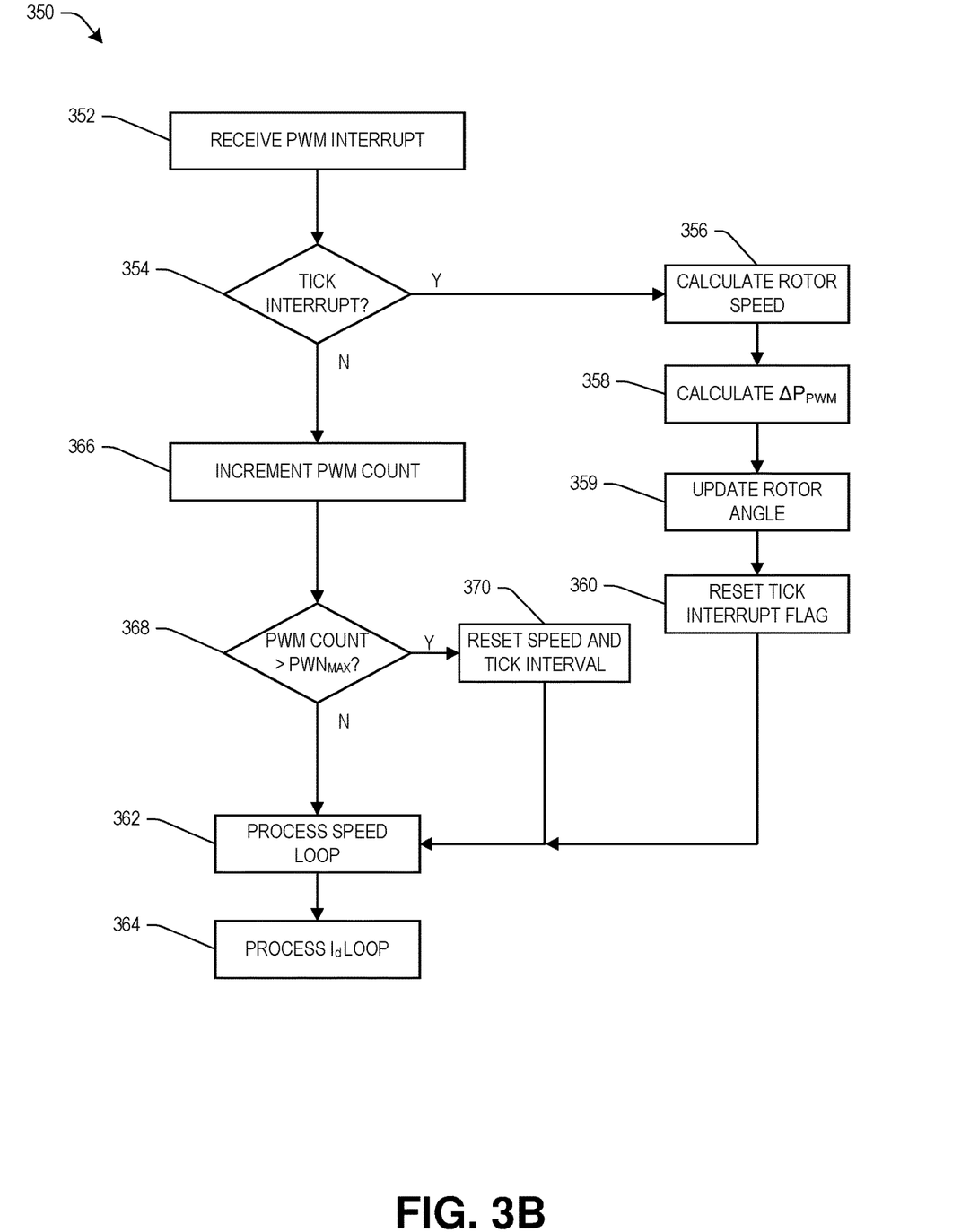

FIGS. 3A and 3B illustrate methods 300, 350 implemented in interrupt service routines for estimating position of a motor, according to some embodiments. For example, the method 300 of FIG. 3A illustrates a tick interrupt service routine, and the method 350 of FIG. 3B illustrates a PWM interrupt service routine. Referring to FIG. 3A, a tick interrupt is received at 302, for example, when an edge occurs in the A or B signals. At 304, the tick interval is determined. For example, the tick interval may be determined using the number of clock cycles recorded by the tick timer 106 normalized based on the clock frequency. At 306, the tick interval, TI, count is compared to a maximum TI threshold, $TI_{MAX}$. In some embodiments, the minimum TI threshold corresponds to a rotor speed of 0.0215 RPM. If the TI is less than or equal to the threshold at 306, the tick interval is filtered at 308. The tick interval may be filtered using an averaging technique, such as a simple average or an EWMA. At 310, the tick timer 106 is adjusted based on the determined tick interval at 304. The tick interrupt is set at 312, and the tick interrupt service routine terminates.

If the tick interval is greater than the threshold at 306, the angle and speed unit 102 resets the rotor speed, $\hat{\omega}$, to zero and resets the tick interval to a value corresponding to a minimum speed of 0.5 RPM at 314. At 314, the filtered tick interval is updated based on the minimum speed, the rotor speed is reset to 0, $\Delta P_{PWM}$ is reset to 0, and the PWM COUNT is reset to 0 (which is updated in 366 of FIG. 3B). At 310, the tick timer 106 is adjusted based on determined tick interval at 304. The tick interrupt is set at 312, and the tick interrupt service routine terminates.

Referring to FIG. 3B, a PWM interrupt is received at 352. At 354, angle and speed unit 102 determines if the tick interrupt flag has been set, for example during the tick interrupt service routine of FIG. 3A. If the tick interrupt flag is set at 354, the angle and speed unit 102 calculates the rotor speed at 356 using the filtered tick signal from 310 of FIG. 3A and calculates the angular position change per PWM cycle metric, $\Delta P_{PWM}$, at 358 based on the PWM count from 366 from a previous iteration of the method 350. At 359 the rotor angular position is updated based on the tick. The angle and speed unit 102 resets the tick interrupt flag at 360. The motor controller 100 executes the speed loop at 362 (e.g., the speed controller 108 in FIG. 1B) and the $I_d$ loop at 364 (e.g., the $I_d$ controller 118 in FIG. 1B) according to the predetermined update frequencies. The PWM interrupt service routine terminates after any required processing at 364.

If the tick interrupt flag is not set at 354, the angle and speed unit 102 increments the PWM count at 366. In some embodiments, the PWM count is averaged over two tick intervals. At 368, the PWM count is compared to a maximum PWM threshold, $PWM_{MAX}$. In some embodiments, the maximum PWM threshold corresponds to a rotor speed of 0.75 RPM. If the PWM count is greater than the threshold at 368, the angle and speed unit 102 resets the rotor speed, $\hat{\omega}$, to zero and resets the tick interval to a value corresponding to a minimum speed of 0.5 RPM at 370 and the motor controller 100 processes the speed loop at 362. If the PWM count is less than or equal to the threshold at 368, the angle and speed unit 102 executes the speed loop at 362 (e.g., the speed controller 108 in FIG. 1B). In the speed loop, the PWM count and the $\Delta P_{PWM}$ parameter are used by the angle and speed unit 102 to update the motor angular position.

By updating the angular position between ticks using the $\Delta P_{PWM}$ metric the angle and speed unit 102 increases the resolution of the position signal, thereby improving control of the motor 104.

Figure 1C:
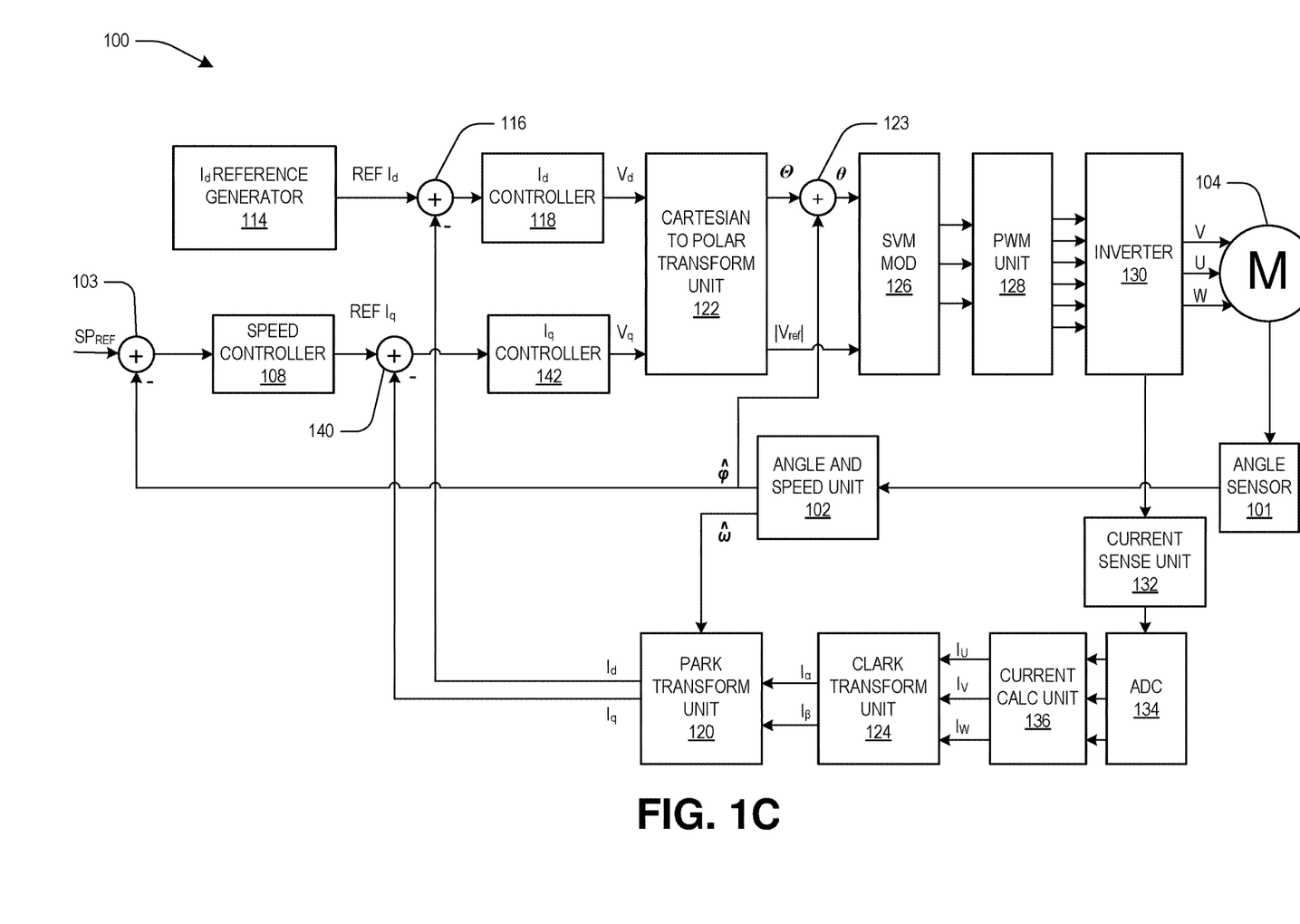

According to some embodiments, the FOC technique employed by the motor controller 100 may be adapted depending on the rotor speed. The control scheme of FIG. 1B may be employed for low rotor speeds. Referring to FIG. 1C, an embodiment of the motor controller 100 adapted for medium speed operation is provided, according to some embodiments. In comparison to FIG. 1B, the feedforward unit 109 is omitted and the LPF 112 and limiter 113 are replaced by an adder 140 and an $I_q$ controller 142. The $I_q$ controller 142 may be a proportional-integral (PI) controller that operates to drive its input signal, which represents an error signal to zero. In some embodiments, the $I_q$ controller 142 may be prone to disturbances due to speed processing variations at low rotor speed and current sensing noise for low currents, making the motor controller 100 of FIG. 1B more suitable for low speed operation.

Figure 1D:
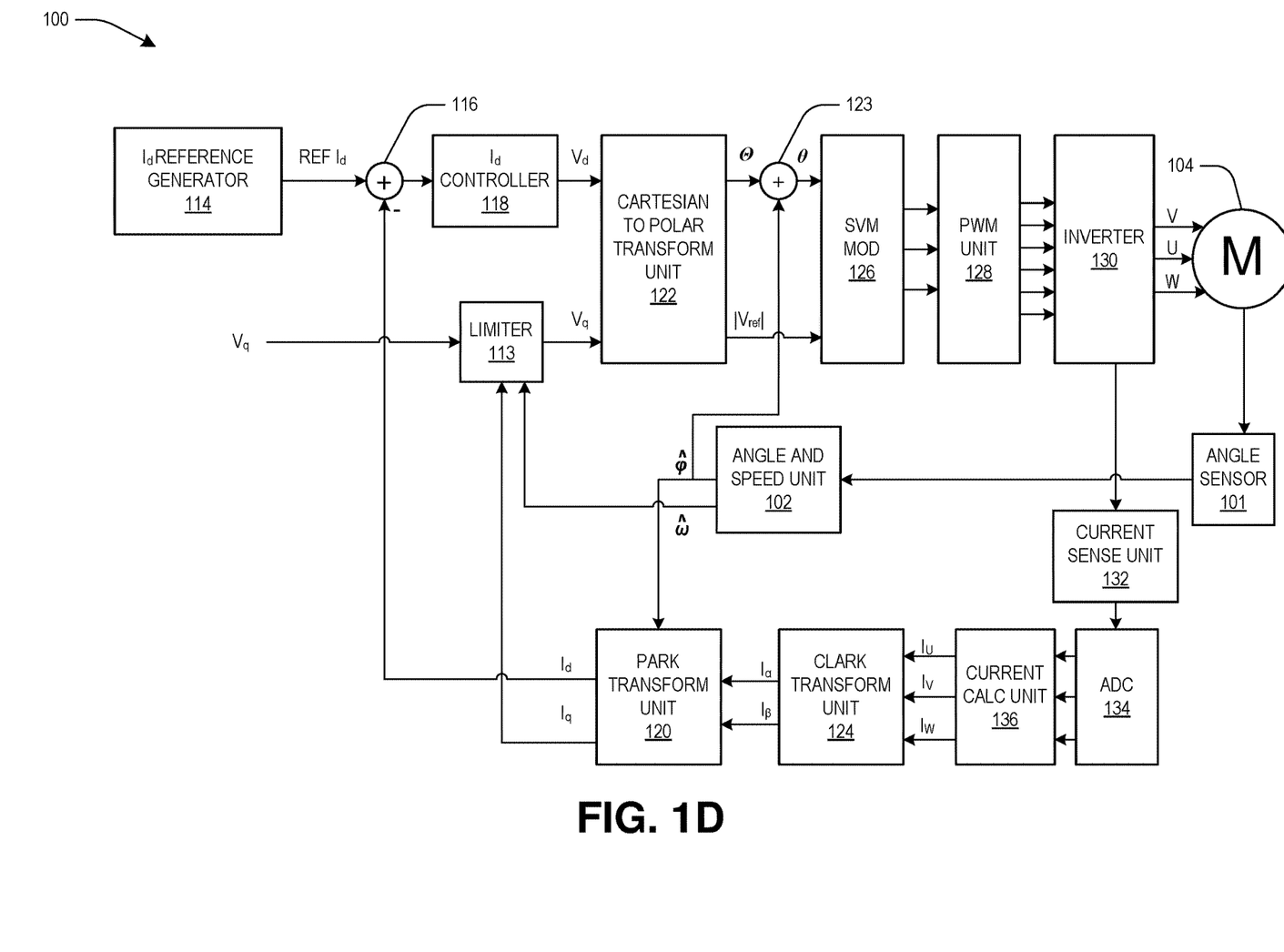

Referring to FIG. 1D, an embodiment of the motor controller 100 adapted for high speed operation is provided, according to some embodiments. In comparison to FIG. 1C, the speed controller 108 and feedforward unit 109 are omitted and the $V_q$ signal is set by a user and fed directly to the optional limiter 113. In some embodiments, the limiter 113 limits $V_q$ based on $I_q$ and rotor speed, $\hat{\omega}$.

In some embodiments, the motor controller 100 may transition between the control schemes of FIG. 1B, 1C, or 1D dynamically according to different requirements of motor operations, such as rotor speed.

Figure 4:
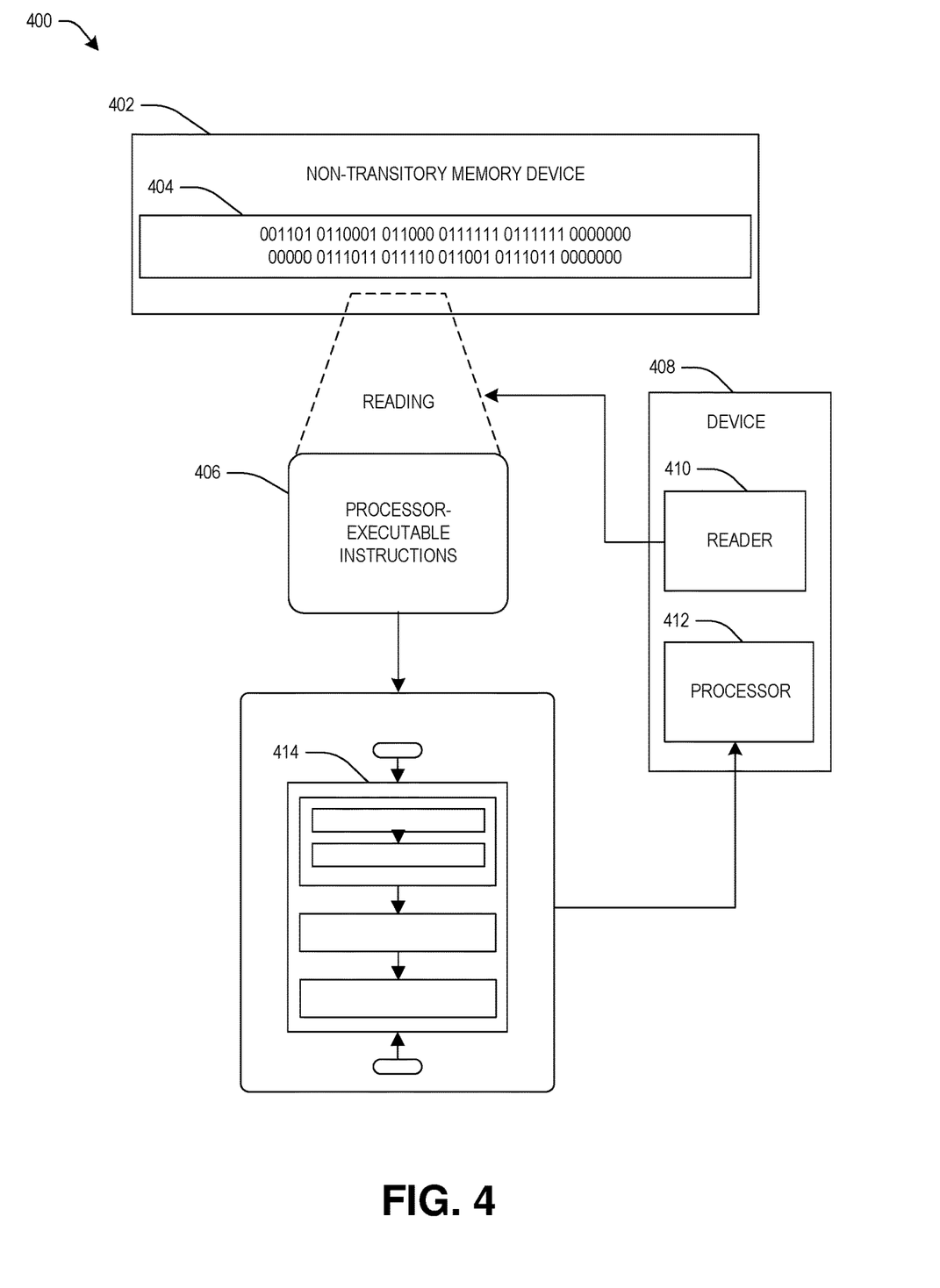
FIG. 4 illustrates an exemplary computer-readable medium, according to some embodiments.

FIG. 4 illustrates an exemplary embodiment 400 of a computer-readable medium 402, according to some embodiments. One or more embodiments involve a computer-readable medium comprising processor-executable instructions configured to implement one or more of the techniques presented herein. The embodiment 400 comprises a non-transitory computer-readable medium 402 (e.g., a CD-R, DVD-R, flash drive, a platter of a hard disk drive, etc.), on which is encoded computer-readable data 404. This computer-readable data 404 in turn comprises a set of processor-executable computer instructions 406 that, when executed by a computing device 408 including a reader 410 for reading the processor-executable computer instructions 406 and a processor 412 for executing the processor-executable computer instructions 406, are configured to facilitate operations according to one or more of the principles set forth herein. In some embodiments, the processor-executable computer instructions 406, when executed, are configured to facilitate performance of a method 414, such as at least some of the aforementioned method(s). In some embodiments, the processor-executable computer instructions 406, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, a method for controlling a motor comprises generating a pulse width modulation (PWM) signal for driving the motor, determining a position of the motor based on transitions in a motor position signal, wherein transition intervals are defined between the transitions, determining a PWM count of cycles in the PWM signal during a first transition interval of the transition intervals, updating the position of the motor during a second transition interval of the transition intervals based on the PWM count to generate an updated position, and controlling the motor based on the updated position.

According to some embodiments, the method comprises determining a position change per PWM cycle metric based on the PWM count and a known position change between the transitions, and updating the position of the motor during one or more transition intervals of the transition intervals based on the position change per PWM cycle metric.

According to some embodiments, the method comprises averaging the position change per PWM cycle metric over multiple transitions to generate an average position change per PWM cycle metric, wherein updating the position of the motor during the one or more transition intervals is based upon the average position change per PWM cycle metric.

According to some embodiments, the motor position signal comprises first encoder pulses and second encoder pulses, and the transitions comprise at least one of rising or falling edges of the first encoder pulses or rising or falling edges of the second encoder pulses.

According to some embodiments, the method comprises executing a transition interrupt service routine responsive to detecting a first transition in the motor position signal, and executing a PWM interrupt service routine responsive to a PWM cycle in the PWM signal, wherein executing the transition interrupt service routine comprises determining a position change per PWM cycle metric based on the PWM count and a known position change between the transitions, and setting a transition interrupt flag, and executing the PWM interrupt service routine comprises responsive to the transition interrupt flag being set, updating the position of the motor based on the first transition and clearing the transition interrupt flag, and responsive to the transition interrupt flag not being set, updating the motor position based on the position change per PWM cycle metric.

According to some embodiments, the method comprises determining a motor speed based on a time interval between at least some of the transitions in the motor position signal, wherein executing the transition interrupt service routine comprises resetting the time interval to a value corresponding to a minimum motor speed responsive to the time interval being greater than a threshold.

According to some embodiments, the method comprises determining a motor speed based on a time interval between at least some of the transitions in the motor position signal, wherein executing the PWM interrupt service routine comprises resetting the time interval to a value corresponding to a minimum motor speed responsive to the PWM count being greater than a threshold.

According to some embodiments, the method comprises determining a motor speed based on a time interval between at least some of the transitions in the motor position signal, and setting the motor speed to zero responsive to the PWM count being greater than a threshold.

According to some embodiments, a motor controller for controlling a motor comprises a position interface configured to receive a motor position signal indicative of a position of the motor, a pulse width modulation (PWM) unit configured to generate a PWM signal for driving the motor, an angle and speed unit configured to determine a speed and a position of the motor based on transitions in the motor position signal, wherein transition intervals are defined between the transitions, determine a PWM count of cycles in the PWM signal during a first transition interval of the transition intervals, and update the position of the motor during a second transition interval of the transition intervals based on the PWM count to generate an updated position, and a controller configured to send a control signal for controlling the motor to the PWM unit based on the speed and the updated position.

According to some embodiments, the angle and speed unit is configured to determine a position change per PWM cycle metric based on the PWM count and a known position change between the transitions, and update the position of the motor during one or more transition intervals of the transition intervals based on the position change per PWM cycle metric.

According to some embodiments, the angle and speed unit is configured to average the position change per PWM cycle metric over multiple transitions to generate an average position change per PWM cycle metric, and update the position of the motor during the one or more transition intervals based upon the average position change per PWM cycle metric.

According to some embodiments, the motor position signal comprises first encoder pulses and second encoder pulses, and the transitions comprise at least one of rising or falling edges of the first encoder pulses or rising or falling edges of the second encoder pulses.

According to some embodiments, the motor controller comprises a processing unit configured to execute a transition interrupt service routine responsive to detecting a first transition in the motor position signal and execute a PWM interrupt service routine responsive to a PWM cycle in the PWM signal, wherein the processing unit is configured to execute the transition interrupt service routine to determine a position change per PWM cycle metric based on the PWM count and a known position change between the transitions, and set a transition interrupt flag, and the processing unit is configured to execute the PWM interrupt service routine to responsive to the transition interrupt flag being set, update the position of the motor based on the first transition and clearing the transition interrupt flag, and responsive to the transition interrupt flag not being set, update the motor position based on the position change per PWM cycle metric.

According to some embodiments, the angle and speed unit is configured to determine a motor speed based on a time interval between at least some of the transitions in the motor position signal, and the processing unit is configured to execute the transition interrupt service routine to reset the time interval to a value corresponding to a minimum motor speed responsive to the time interval being greater than a threshold.

According to some embodiments, the angle and speed unit is configured to determine a motor speed based on a time interval between at least some of the transitions in the motor position signal, and the processing unit is configured to execute the PWM interrupt service routine to reset the time interval to a value corresponding to a minimum motor speed responsive to the PWM count being greater than a threshold.

According to some embodiments, a system comprises a motor, an angle sensor interfacing with the motor to generate pulses indicative of a position of the motor, a motor controller comprising a position interface configured to receive the pulses, a pulse width modulation (PWM) unit configured to generate a PWM signal for driving the motor, an angle and speed unit configured to determine a speed and a position of the motor based on transitions in the pulses, wherein transition intervals are defined between the transitions, determine a PWM count of cycles in the PWM signal during a first transition interval of the transition intervals, and update the position of the motor during a second transition interval of the transition intervals based on the PWM count to generate an updated position, and a controller configured to send a control signal for controlling the motor to the PWM unit based on the speed and the updated position.

According to some embodiments, the angle and speed unit is configured to determine a position change per PWM cycle metric based on the PWM count and a known position change between the transitions, and update the position of the motor during one or more transition intervals of the transition intervals based on the position change per PWM cycle metric.

According to some embodiments, the system comprises a processing unit configured to execute a transition interrupt service routine responsive to detecting a first transition in the pulses and execute a PWM interrupt service routine responsive to a PWM cycle in the PWM signal, wherein the processing unit is configured to execute the transition interrupt service routine to determine a position change per PWM cycle metric based on the PWM count and a known position change between the transitions, and set a transition interrupt flag, and the processing unit is configured to execute the PWM interrupt service routine to responsive to the transition interrupt flag being set, update the position of the motor based on the first transition and clearing the transition interrupt flag, and responsive to the transition interrupt flag not being set, update the motor position based on the position change per PWM cycle metric.

According to some embodiments, the angle and speed unit is configured to determine a motor speed based on the transitions in the pulses, and the processing unit is configured to execute the transition interrupt service routine to determine a time interval between at least some of the transitions in the pulses, and reset the motor speed to a minimum speed setting responsive to the time interval being greater than a threshold.

According to some embodiments, the angle and speed unit is configured to determine a motor speed based on the transitions in the pulses, and the processing unit is configured to execute the PWM interrupt service routine to reset the motor speed to a minimum speed setting responsive to the PWM count being greater than a threshold.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessary in some embodiments.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method for controlling a motor comprising:
   generating a pulse width modulation (PWM) signal for driving the motor;
   determining a position of the motor based on transitions in a motor position signal, wherein transition intervals are defined between the transitions;
   determining a PWM count of cycles in the PWM signal during a first transition interval of the transition intervals;
   updating the position of the motor during a second transition interval of the transition intervals based on the PWM count to generate an updated position; and
   controlling the motor based on the updated position.

2. The method of claim 1, comprising:
   determining a position change per PWM cycle metric based on the PWM count and a known position change between the transitions, and
   updating the position of the motor during one or more transition intervals of the transition intervals based on the position change per PWM cycle metric.

3. The method of claim 2, comprising:
   averaging the position change per PWM cycle metric over multiple transitions to generate an average position change per PWM cycle metric, wherein:
   updating the position of the motor during the one or more transition intervals is based upon the average position change per PWM cycle metric.

4. The method of claim 1, wherein:
   the motor position signal comprises first encoder pulses and second encoder pulses; and
   the transitions comprise at least one of rising or falling edges of the first encoder pulses or rising or falling edges of the second encoder pulses.

5. The method of claim 1, comprising:
   executing a transition interrupt service routine responsive to detecting a first transition in the motor position signal; and
   executing a PWM interrupt service routine responsive to a PWM cycle in the PWM signal, wherein:
   executing the transition interrupt service routine comprises:
      determining a position change per PWM cycle metric based on the PWM count and a known position change between the transitions; and
      setting a transition interrupt flag; and
   executing the PWM interrupt service routine comprises:
      responsive to the transition interrupt flag being set, updating the position of the motor based on the first transition and clearing the transition interrupt flag; and
      responsive to the transition interrupt flag not being set, updating the motor position based on the position change per PWM cycle metric.

6. The method of claim 5, comprising:
   determining a motor speed based on a time interval between at least some of the transitions in the motor position signal, wherein executing the transition interrupt service routine comprises:
      resetting the time interval to a value corresponding to a minimum motor speed responsive to the time interval being greater than a threshold.

7. The method of claim 5, comprising:
   determining a motor speed based on a time interval between at least some of the transitions in the motor position signal, wherein executing the PWM interrupt service routine comprises:
      resetting the time interval to a value corresponding to a minimum motor speed responsive to the PWM count being greater than a threshold.

8. The method of claim 1, comprising:
   determining a motor speed based on a time interval between at least some of the transitions in the motor position signal; and
   setting the motor speed to zero responsive to the PWM count being greater than a threshold.

9. A motor controller for controlling a motor comprising:
   a position interface configured to receive a motor position signal indicative of a position of the motor;
   a pulse width modulation (PWM) unit configured to generate a PWM signal for driving the motor;
   an angle and speed unit configured to:
      determine a speed and a position of the motor based on transitions in the motor position signal, wherein transition intervals are defined between the transitions;
      determine a PWM count of cycles in the PWM signal during a first transition interval of the transition intervals; and
      update the position of the motor during a second transition interval of the transition intervals based on the PWM count to generate an updated position; and
   a controller configured to send a control signal for controlling the motor to the PWM unit based on the speed and the updated position.

10. The motor controller of claim 9, wherein the angle and speed unit is configured to:
    determine a position change per PWM cycle metric based on the PWM count and a known position change between the transitions; and
    update the position of the motor during one or more transition intervals of the transition intervals based on the position change per PWM cycle metric.

11. The motor controller of claim 10, wherein the angle and speed unit is configured to:
    average the position change per PWM cycle metric over multiple transitions to generate an average position change per PWM cycle metric, and
    update the position of the motor during the one or more transition intervals based upon the average position change per PWM cycle metric.

12. The motor controller of claim 9, wherein:
    the motor position signal comprises first encoder pulses and second encoder pulses; and
    the transitions comprise at least one of rising or falling edges of the first encoder pulses or rising or falling edges of the second encoder pulses.

13. The motor controller of claim 9, comprising:
    a processing unit configured to execute a transition interrupt service routine responsive to detecting a first transition in the motor position signal and execute a PWM interrupt service routine responsive to a PWM cycle in the PWM signal, wherein:

the processing unit is configured to execute the transition interrupt service routine to:
- determine a position change per PWM cycle metric based on the PWM count and a known position change between the transitions; and
- set a transition interrupt flag; and the processing unit is configured to execute the PWM interrupt service routine to:
- responsive to the transition interrupt flag being set, update the position of the motor based on the first transition and clearing the transition interrupt flag; and
- responsive to the transition interrupt flag not being set, update the motor position based on the position change per PWM cycle metric.

14. The motor controller of claim 13, wherein:

the angle and speed unit is configured to determine a motor speed based on a time interval between at least some of the transitions in the motor position signal; and the processing unit is configured to execute the transition interrupt service routine to:
- reset the time interval to a value corresponding to a minimum motor speed responsive to the time interval being greater than a threshold.

15. The motor controller of claim 13, wherein:

the angle and speed unit is configured to determine a motor speed based on a time interval between at least some of the transitions in the motor position signal; and the processing unit is configured to execute the PWM interrupt service routine to:
- reset the time interval to a value corresponding to a minimum motor speed responsive to the PWM count being greater than a threshold.

16. A system, comprising:

a motor;

an angle sensor interfacing with the motor to generate pulses indicative of a position of the motor;

a motor controller, comprising:
- a position interface configured to receive the pulses;
- a pulse width modulation (PWM) unit configured to generate a PWM signal for driving the motor;
- an angle and speed unit configured to:
  - determine a speed and a position of the motor based on transitions in the pulses, wherein transition intervals are defined between the transitions;
  - determine a PWM count of cycles in the PWM signal during a first transition interval of the transition intervals; and
  - update the position of the motor during a second transition interval of the transition intervals based on the PWM count to generate an updated position; and
- a controller configured to send a control signal for controlling the motor to the PWM unit based on the speed and the updated position.

17. The system of claim 16, wherein the angle and speed unit is configured to:
- determine a position change per PWM cycle metric based on the PWM count and a known position change between the transitions; and
- update the position of the motor during one or more transition intervals of the transition intervals based on the position change per PWM cycle metric.

18. The system of claim 16, comprising:

a processing unit configured to execute a transition interrupt service routine responsive to detecting a first transition in the pulses and execute a PWM interrupt service routine responsive to a PWM cycle in the PWM signal, wherein:

the processing unit is configured to execute the transition interrupt service routine to:
- determine a position change per PWM cycle metric based on the PWM count and a known position change between the transitions; and
- set a transition interrupt flag; and the processing unit is configured to execute the PWM interrupt service routine to:
- responsive to the transition interrupt flag being set, update the position of the motor based on the first transition and clearing the transition interrupt flag; and
- responsive to the transition interrupt flag not being set, update the motor position based on the position change per PWM cycle metric.

19. The system of claim 18, wherein:

the angle and speed unit is configured to determine a motor speed based on the transitions in the pulses; and the processing unit is configured to execute the transition interrupt service routine to:
- determine a time interval between at least some of the transitions in the pulses; and
- reset the motor speed to a minimum speed setting responsive to the time interval being greater than a threshold.

20. The system of claim 18, wherein:

the angle and speed unit is configured to determine a motor speed based on the transitions in the pulses; and the processing unit is configured to execute the PWM interrupt service routine to:
- reset the motor speed to a minimum speed setting responsive to the PWM count being greater than a threshold.

* * * * *